United States Patent [19]

Murphy et al.

[11] Patent Number: 4,779,967
[45] Date of Patent: Oct. 25, 1988

[54] OBJECTIVE LENS ASSEMBLY

[75] Inventors: Robert A. Murphy, Lakewood; Mark G. Arenal, Laguna Niguel, both of Calif.

[73] Assignee: Ram Optical Instrumentation, Inc., Huntington Beach, Calif.

[21] Appl. No.: 880,777

[22] Filed: Jul. 1, 1986

[51] Int. Cl.⁴ .................. G02B 7/04; G02B 21/06; G02B 21/02
[52] U.S. Cl. .................. 350/518; 350/525; 350/414
[58] Field of Search .................. 350/506–507, 350/518, 520–521, 525, 572–573, 414

[56] References Cited

U.S. PATENT DOCUMENTS

| | | | |
|---|---|---|---|
| 1,848,788 | 3/1932 | Loeck | 350/372 |
| 2,533,371 | 12/1950 | Heine | 350/255 |
| 3,514,186 | 5/1970 | Poncelet | 350/506 |
| 3,861,786 | 1/1975 | Badgett | 350/255 |
| 4,664,486 | 5/1987 | Landre et al. | 350/414 |

FOREIGN PATENT DOCUMENTS

| | | | |
|---|---|---|---|
| 2301597 | 7/1974 | Fed. Rep. of Germany | 350/525 |
| 634224 | 11/1978 | U.S.S.R. | 350/573 |

OTHER PUBLICATIONS

Ellsworth et al., "Macroscope Dark Field Illumination System" IBM Tech. Disc. Bull., 9-1976, pp. 1274–1275.

Primary Examiner—William H. Punter
Attorney, Agent, or Firm—Nilsson, Robbins, Dalgarn, Berliner, Carson & Wurst

[57] ABSTRACT

An objective lens system having a pair of plano-convex lenses disposed adjacent each other with the convex surfaces facing each other and aligned along common optical axis. A plurality of optical fibers surround the plan-convex lenses to convey light and illuminate an object to be viewed by the objective lens assembly. Adjustably positioned adjacent the second plano-convex lens is a field lens system including an elongate rod lens for conducting the intermediate image from the plano-convex lenses and to relay it to an ocular lens system for viewing by the user.

5 Claims, 1 Drawing Sheet

OBJECTIVE LENS ASSEMBLY

BACKGROUND OF THE INVENTION

The present invention relates to microscope devices and more particularly to objective lens assemblies for use in visually inspecting small-sized parts.

It is frequently desirable to visually inspect small-sized articles of manufacture having parts with substantial depth dimensions such as small diameter bore holes. Traditionally, microscopes having conventional lens systems adapted for viewing slides of specimens have been used to inspect parts which are too small to be clearly viewed by the naked eye. However, such microscopes generally have a very shallow fields at the object plane. Consequently, if the part to be inspected has any significant depth dimensions associated with its features the microscope must be repeatedly refocused in order for the user to be able to examine the entire part. Refocusing takes time and is tiring on the eyes of the user. Further, these microscopes generally do not provide for adequate surface illumination of the part being inspected which makes the inspection of contoured and recessed surfaces even more difficult.

The present invention provides an objective lens assembly which features substantial depth of field at the object plane so that parts can be easily viewed with clarity throughout their depth with a minimum amount of refocusing. Further, the present invention provides a lens assembly which efficiently furnishes illumination to the object being inspected and which is compact in design and is adaptable to be fitted on most conventional microscope bodies.

SUMMARY OF THE INVENTION

The present invention comprises an objective lens assembly for use in inspecting small-sized parts. The present invention includes a pair of adjacent plano-convex lenses, a field lens system and a mechanism for illuminating the part being inspected. The plano-convex lenses are positioned with their convex surfaces facing each other and are aligned along a common optical axis with the field lens system.

In the preferred embodiment, the plano-convex lenses have short radii of curvature of about one-eighth of an inch and form a comparably small aperture opening. The field lens system includes an elongate rod lens and is positionally adjustable for accomplishing any focusing that may be required. The illumination mechanism includes a set of light conducting fibers coaxially mounted in a ring around the plano-convex lenses.

In operation, the pair of plano-convex lenses receives light from the object being inspected and focuses that light into an image characterized by substantial depth of field. The field lens system receives light from that image, processes the light and relays it to an ocular lens system for viewing by the user. The illumination mechanism directs light onto the object being inspected so that it can be clearly viewed by the user.

DESCRIPTION OF THE PREFERRED EMBODIMENT

Figure 1:
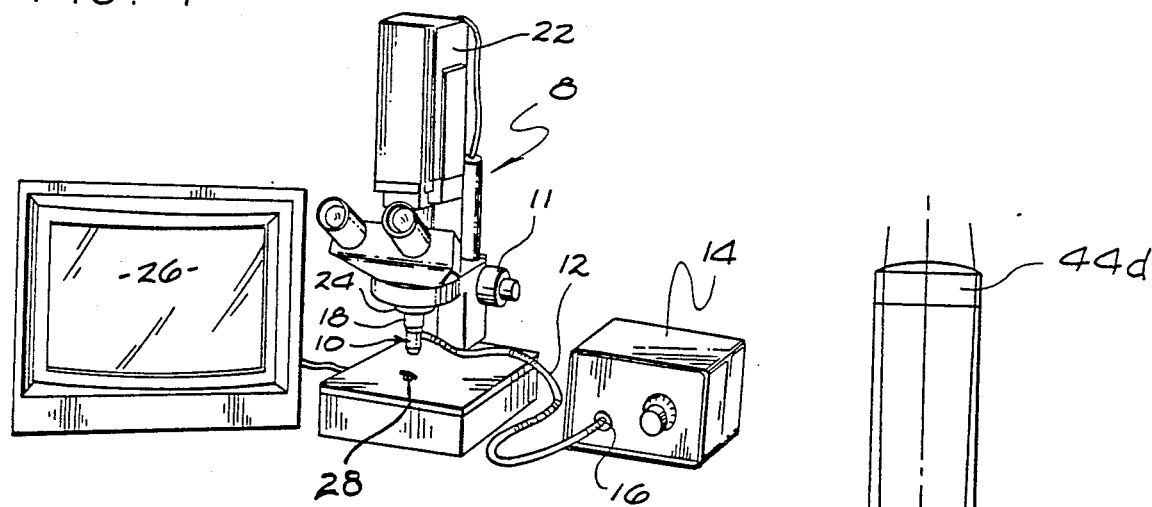
FIG. 1 shows a perspective view of the objective lens assembly of the present invention mounted for use on a binocular microscope.

Referring now to FIG. 1, a perspective view of the objective lens assembly which constitutes the present invention is shown as mounted for use on an otherwise conventional binocular microscope 8. The assembly includes a circular body 10 which is tapered toward its lower end and a light fiber containing cable 12 attached to one side of the body 10. The cable 12 is also attached to a high intensity light source 14 through a connector 16 at the far end of the cable opposite the body 10. The middle part of the body 10 is concentrically surrounded by a rotatable focusing ring 18 which is used to provide a manually operated focusing capability. The upper part of the body 10 is secured to a mounting piece 24. The mounting piece 24 is detachable from the body 10 and can be replaced by way of a variety of couplers suitable for connecting the objective lens assembly to any of a number of microscopes. The microscope 8 also includes a video camera 22 for recording the image produced by the objective assembly which is connected to a video monitor 26 for providing a video display.

Figure 2:
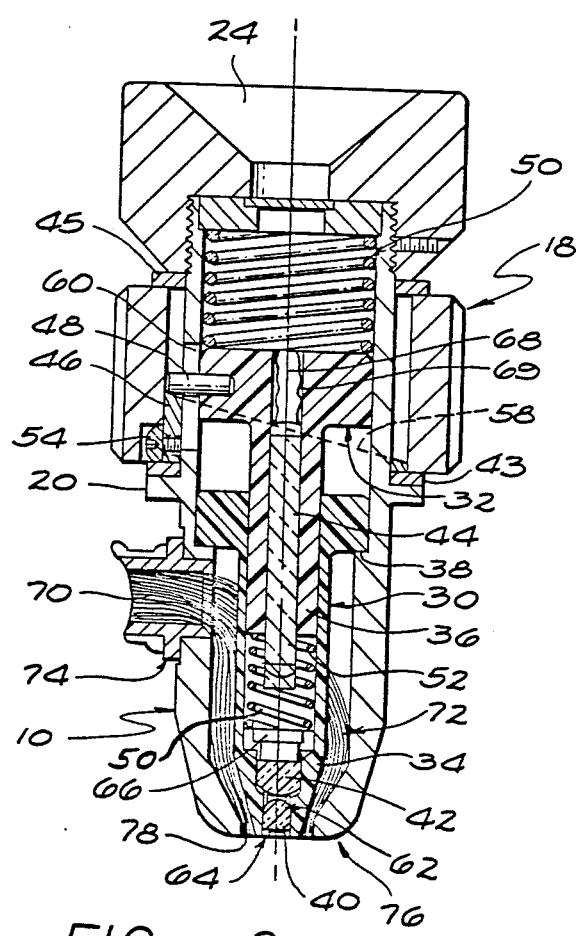
FIG. 2 shows a cross-section of the objective lens assembly of the present invention.

Referring now to FIG. 2, a cross-section of the objective lens assembly is shown. The objective assembly includes an objective housing 30 and a field lens housing 32 which are secured within the interior of the body 10 and function to hold the lenses 40, 42 and 44 in position. The housings 30 and 32 are both circular in construction and fit concentrically within the body 10 so that their positions are horizontally fixed. Further, both housings 30 and 32 have cylindrically shaped elements 34 and 36 which extend downward toward the object being viewed 28 and provide the actual mounting locations for the optical lenses 40, 42 and 44. The objective housing 30 is secured to the shoulder 38 of the body 10 so that its position is also vertically fixed. However, the position of the field lens housing 32 is vertically adjustable through rotation of the focusing ring 18, the action of the cam sleeve 46, the drive pin 48 and the springs 50 and 52. The spring 50 bears on the upper axial end of the housing 32 while the spring 52 bears on the lower axial end of the housing 32. Together the two springs preload the housing so that the position of the housing 32 with respect to the body 10 can be smoothly adjusted. The focusing ring 18 is mounted between the retaining ledge 20 and a washer 43 and the mounting piece 24 and a washer 45 so that its movements are vertically constrained. The cam sleeve 46 is positioned between the focusing ring 18 and the body 10. The cam sleeve 46 is rotationally secured to the focusing ring 18 by the stop bolt 54 and its upper surface 58 is in sliding contact with the drive pin 48. The cam sleeve 46 is sloped around its circumference on its upper surface as shown by the dashed line 58. The drive pin 48 is attached to the housing 32 but is vertically movable in the slot 60 in the body 10 in response to the position of the cam sleeve 46 and the focusing ring 18. The structural elements of the lens asssembly such as the body 10, housings 30 and 32, focusing ring 18 and cam sleeve 46 may be manufactured of conventional metals such as brass using traditional metal working machines and techniques such as lathes and milling machines.

The lens 40 and 42 are mounted immediately adjacent to one another within circular cavities in the lower end of the housing 30. The lenses 40 and 42 are separated by a small spacer 62 which is of much lesser width than the radii of curvature of the lenses. The lens 40 and 42 are held in position by the washer 64 and the objective retainer 66 which is loaded by the spring 50. The lens 44 is mounted in the circular passage 68 in the housing 32. The lens 44 is cemented into the passage 68 along with a convoluted spacer 69 having a black matt finish for absorbing any stray light.

The cable 14 contains a bundle 70 of light conducting fibers. The cable 14 connects to the inlet fixture 74 of the body 10. The bundle 70 is split into groups 72 of separate fibers which extend coaxially around the housing 30 and the lenses 40 and 42 in the annular spaces between the body 10 and housing 30. The lower tips 76 of the fibers are cemented into a ring 78 concentric with the lens 40. The ends of the fibers which form the ring are cut flush the body 10 and polished to allow them to efficiently emit light toward the object 28 being viewed.

Figure 3:
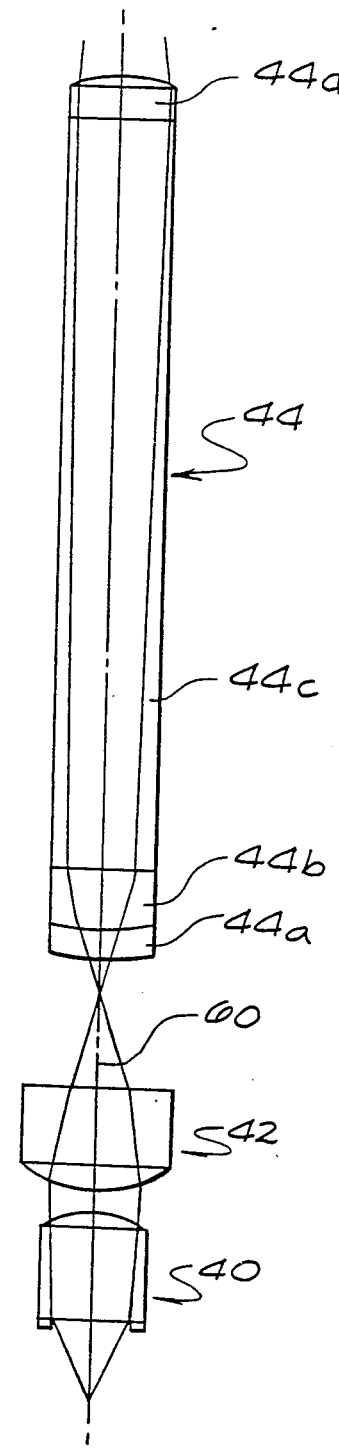
FIG. 3 shows a schematic light ray diagram for the lens components of the objective lens assembly.

Referring now to FIG. 3, an enlarged view of the lens system without its supporting structure is illustrated. The lenses 40, 42 and 44 are aligned in the order given along a common optical axis 60. The lens 40 is a thick plano-convex lens having a very small radius of curvature which will preferably range between 0.05 and 0.3 inch and a comparably small aperture which will preferably range between 0.04 to 0.25 inch. The lens 42 is also a thick plano-convex lens having the same radius of curvature as the lens 40. The lens 42 is wider than the lens 40 to allow it to be more easily mounted within the housing 30. The lenses 40 and 42 are mounted in close proximity so that they are separated by a distance which is much less the radii of the curvature of the lenses and are mounted in opposed fashion so that their convex surfaces face one another. The lenses 40 and 42 act to receive light from the object being inspected and transmit an image of that object characterized by a substantial depth of field to the field lens 44. The lens 44 actually includes four separate lens parts, 44a, 44b, 44c and 44d. The lens parts 44a and 44b form an achromatic lens pair for magnifying the image and for correcting the image for chromatic aberrations. The lens part 44c is a rod lens with a ground surface around its cylindrical circumference for transmitting an image with a minimum of divergence, diffusion and reflective losses. The lens part 44d is a focusing lens for helping to properly relay the image to an ocular lens system. The exact characteristics of a set of suitable lenses for an objective lens assembly as shown in FIG. 2 and 3 are given in Table I below.

TABLE I

|  | Lens 40 | Lens 42 | Lenses 44a, 44b, 44c, 44d |
|---|---|---|---|
| Radius of Curvature | .123" | .123" | .530/.290", .290", 0", .545" |
| Diameter | .106" | .152" | .183", .183", .183", .183" |
| Thickness | .105" | .105" | .040", .080", 1.25", .070" |
| Index of Refraction | 1.51680 | 1.51680 | 1.78831, 1.72000, 1.62041, 1.720 |
| Dispersion | 64.17 | 64.17 | 47.7, 50.2, 60.3, 50.2 |

The lenses described above may be manufactured using conventional lens grinding techniques. The lenses described in Table I would provide an assembly adapted for inspecting efficiently parts having dimensions typically in the range of 1 to 100 thousandths of an inch in size and depth dimensions of up to 1 to 3 inches.

Referring now again to FIG. 1, in operation the objective lens assembly may be attached to a conventional microscope 8. The cable 12 is connected to a high intensity light source 14. The object to be viewed 28 is then placed under the objective lens assembly and the light source 14 turned on. The height of the objective assembly is adjusted to the appropriate range for the magnification desired using the microscope positioning controls 11. If necessary, the focusing ring 18 is then rotated to adjust the position of the field lens system 44 (see FIG. 2) and bring the object into proper focus. The object may then be visually examined through the microscope 8. The light fibers and ring 72 provide the required illumination. The lenses 40 and 42 (see FIGS. 2 and 3) cooperate to provide an image characterized by substantial depth of field and only minor aberrations. The lens system 44 helps to correct any aberrations in the image and relays it (directly or indirectly) up to the ocular lens system for the microscope with a limited amount of divergence and light loss.

While the system of this invention has been described in conjunction with particular embodiments, it should be apparent that certain changes could be made without departing from the principles of the invention. Consequently, the embodiments provided are intended to be illustrative only and are not meant to limit the scope of the following claims.

We claim:

1. An objective lens assembly for use in visually inspecting small sized parts microscope applications for viewing an object, comprising:

a pair of plano-convex lenses for receiving light from an object and forming an optical image of the same, said lenses having equal radii of curvature of from 0.05 to 0.3 inch and said lenses mounted so that they are maintained in close proximity to one another and the convex surfaces of the lenses face one another; means for illuminating said object with high intensity light;

means for receiving light from image formed by said pair of plano-convex lens and relaying said image to an ocular lens system comprising a field lens system including an achromatic lens pair for correcting for chromatic abberations, an elongate rod lens for transmitting the image with reduced divergence and a relay lens for focusing the image for further transmission.

2. The objective lens assembly of claim 1, wherein said means for illuminating comprises a ring of light conducting fibers coaxial with said pair of plano-convex lenses.

3. An objective lens assembly for use in microscope applications for viewing an object, comprising:

a pair of plano-convex lenses for receiving light from an object and forming an optical image of the same, said lenses having equal radii of the curvature of from 0.05 to 0.3 inch and said lenses mounted so that they are maintained in close proximity to one another and the convex surfaces of the lenses face one another;

a plurality of light conducting fibers mounted in a ring coaxial with said pair of plano-convex lenses for illuminating said object;

a field lens system including an achromatic lens pair of plano-convex lenses, processing the image and relaying it to an ocular lens system.

4. The objective lens assembly of claim 1, further including focusing means for adjusting the position of said field lens system relative to said pair of plano-convex lenses, said focusing means including a drive pin attached to said lens system, a cam sleeve in slidable contact with said drive pin and a rotatable focusing ring attached to said cam sleeve.

5. The objective lens assembly of claim 4 which further includes a housing for receiving said field lens system; and spring means disposed at opposite ends of said housing to support said housing for smooth focusing adjustment of said field lens system.

* * * * *